United States Patent
Harada et al.

(10) Patent No.: US 8,838,133 B2
(45) Date of Patent: Sep. 16, 2014

(54) MOBILE COMMUNICATION APPARATUS, POSITION INFORMATION ACQUIRING METHOD, AND COMPUTER-READABLE STORAGE MEDIUM

(75) Inventors: Noriyuki Harada, Kawasaki (JP); Hiroshi Kanno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 400 days.

(21) Appl. No.: 13/331,510

(22) Filed: Dec. 20, 2011

(65) Prior Publication Data

US 2012/0088520 A1   Apr. 12, 2012

Related U.S. Application Data

(63) Continuation of application No. PCT/JP2009/002963, filed on Jun. 26, 2009.

(51) Int. Cl.
    H04W 24/00   (2009.01)
    G01C 21/20   (2006.01)
    H04M 1/725   (2006.01)
    H04W 4/02    (2009.01)
    H04W 4/20    (2009.01)

(52) U.S. Cl.
    CPC .......... *H04M 1/72522* (2013.01); *H04W 4/206* (2013.01); *G01C 21/20* (2013.01); *H04W 4/023* (2013.01)
    USPC .................... 455/456.1; 455/456.6; 455/41.2; 701/533; 701/469; 342/457; 342/357.59

(58) Field of Classification Search
    CPC ........ H04W 64/00; H04W 4/02; H04L 29/08; G01S 5/12; G01S 5/02; G01S 5/04
    USPC ........ 455/456.1, 457, 41.2, 456.6; 342/357.3, 342/453, 450, 442, 357.59, 457; 702/153; 370/338; 701/533, 469
    See application file for complete search history.

(56) References Cited

U.S. PATENT DOCUMENTS

| | | | |
|---|---|---|---|
| 5,936,571 A * | 8/1999 | Desjardins | 342/357.59 |
| 6,608,592 B2 * | 8/2003 | McReynolds | 342/418 |
| 8,019,512 B2 * | 9/2011 | Kamioka et al. | 701/49 |

(Continued)

FOREIGN PATENT DOCUMENTS

| | | |
|---|---|---|
| JP | 2001-275147 | 10/2001 |
| JP | 2003-234805 | 8/2003 |

(Continued)

OTHER PUBLICATIONS

International Search Report for PCT/JP2009/002963 mailed Aug. 25, 2009.

*Primary Examiner* — Mahendra Patel
(74) *Attorney, Agent, or Firm* — Staas & Halsey LLP

(57) ABSTRACT

A mobile communication apparatus may receive a first direction from a reference target to an external apparatus and a first distance from the reference target to a position of the external apparatus. A direction acquiring unit acquires a second direction from the reference target to the position, and a distance acquiring unit acquires a second distance between the reference target and the position. A computing unit computes a direction and a distance from the position to the external apparatus based on the first direction, the first distance, the second direction and the second distance, in order to output a computation result from an output unit.

18 Claims, 11 Drawing Sheets

(56) References Cited

U.S. PATENT DOCUMENTS

| | | |
|---|---|---|
| 2003/0109988 A1* | 6/2003 | Geissler et al. ............... 701/213 |
| 2004/0203380 A1* | 10/2004 | Hamdi et al. ................. 455/41.2 |
| 2007/0037518 A1* | 2/2007 | Ninomiya et al. ........... 455/41.2 |
| 2008/0063262 A1* | 3/2008 | Cowperthwaite et al. .... 382/154 |
| 2008/0242314 A1* | 10/2008 | McFarland ................. 455/456.1 |
| 2008/0266617 A1* | 10/2008 | Suzuki ......................... 358/474 |

FOREIGN PATENT DOCUMENTS

| | | |
|---|---|---|
| JP | 2004-317715 | 11/2004 |
| JP | 2005-17074 | 1/2005 |
| JP | 2009-2850 | 1/2009 |

* cited by examiner

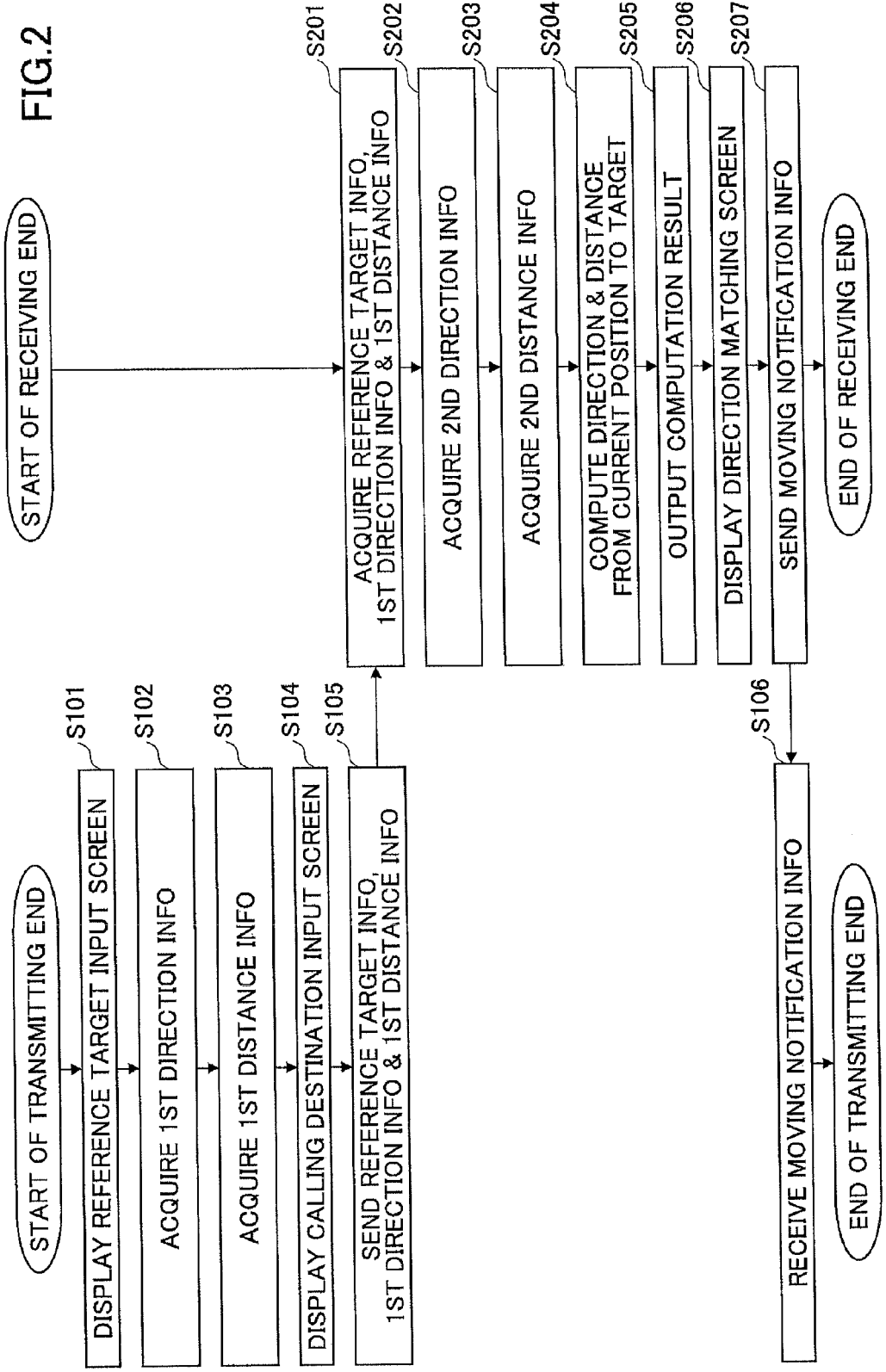

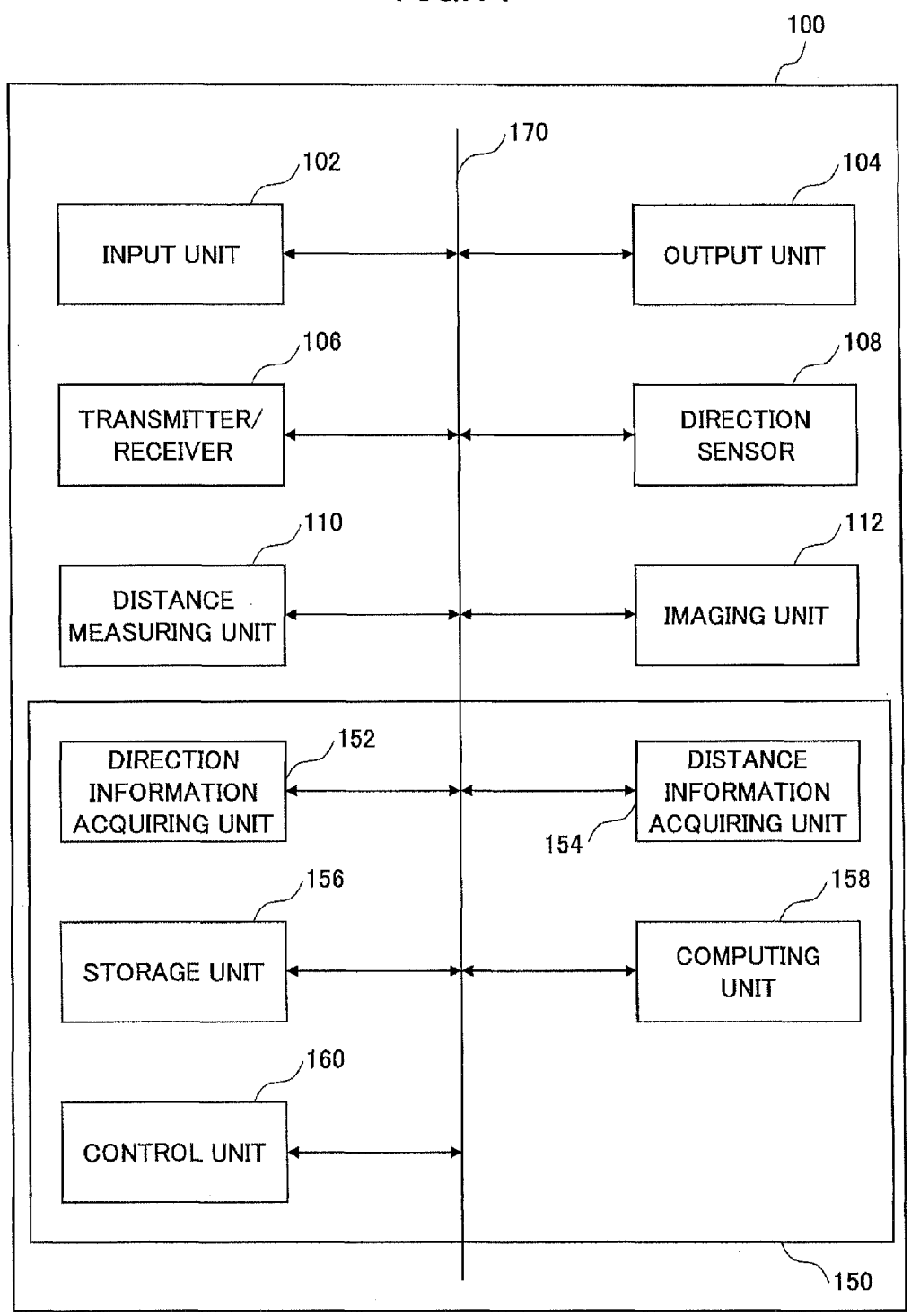

MOBILE COMMUNICATION APPARATUS, POSITION INFORMATION ACQUIRING METHOD, AND COMPUTER-READABLE STORAGE MEDIUM

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2009/002963 filed on Jun. 26, 2009, in the Japanese Patent Office, the disclosure of which is hereby incorporated by reference.

FIELD

The present invention relates to mobile communication apparatuses, position information acquiring methods, and computer-readable storage media.

BACKGROUND

When a person wishes to meet a friend at a crowded place such as an event site or, the person wishes to reunite with the friend who got separated at the event site, the person may use a portable telephone and call the friend in order to meet or reunite with the friend. The person may communicate with the friend using their portable telephones, and the two may notify their respective current positions. However, even when a common landmark or the like is located near their current positions, it may be difficult for the two to immediately recognize each other's current positions.

On the other hand, a portable telephone equipped with the GPS (Global Positioning System) may acquire the current position of the portable telephone. Hence, the user of such a portable telephone may send the current position acquired by the GPS to the friend also using such a portable telephone, so that the two may recognize their respective current positions. The user may use his own current position and the current position of the friend, in order to move to the current position of the friend.

However, it may be difficult for the portable telephone equipped with the GPS to acquire the current position when the portable telephone is at a location where it is difficult for radio waves to reach the portable telephone, such as indoors. When an error in the current position of the portable telephone acquired by the GPS is large due to a poor radio wave reception state, it may be impossible for the user to meet or unite with the friend even when the two communicate using their portable telephones. Even outdoors, the GPS may be unable to accurately detect a positional error on the order of several meters, for example, depending on the radio wave reception state. For this reason, the person may not be able to meet or reunite with the friend even when the distance between the two is on the order of 15 meters, for example, and relatively close. The positional error of the GPS may be larger near buildings due to interference, and in this case, it may be difficult for the person and the friend to meet or reunite outdoors in the crowd.

On the other hand, an information processing apparatus equipped with a GPS has been proposed to acquire position information indicating the current position, and to additionally acquire direction information indicating the direction in which the information processing apparatus is facing, and distance information indicating the distance from the information processing apparatus to a predetermined position. This proposed information processing apparatus includes a function to compute position information indicating a predetermined target position, based on the acquired position information, direction information and distance information. However, this proposed information processing apparatus may not function effectively when accurate position information cannot be acquired by the GPS due to poor radio wave reception state, and it may be difficult for the person and the friend to meet or reunite in the crowd using such proposed information processing apparatuses.

A portable telephone equipped with a magnetometer or attitude sensor has also been proposed. This proposed portable telephone measures the direction in which the portable telephone is currently facing, based on the earth magnetism measured by the magnetometer, and sends the measured result to the friend's portable telephone. The friend's portable telephone also sends the direction in which the friend's portable telephone is currently facing, based on the measured earth magnetism. Hence, the proposed portable telephone may use its facing direction and the friend's facing direction received from the friend's portable telephone, in order to judge whether the two are facing each other and send the judgement result to the friend's portable telephone. Such a communication may be continued to enable the two to meet or reunite even in the crowd. However, the proposed portable telephone merely enables the two to recognize the direction in which the other party is currently located, and there is no way of knowing the distance separating the two. In addition, the direction in which the person is facing and the direction in which the portable telephone is facing must match, and the direction in which the friend is facing and the direction in which the friend's portable telephone is facing must match, in order for the two to recognize each other's direction. Consequently, it may be difficult for the person and the friend to meet or reunite in the crowd using such proposed portable telephones.

SUMMARY

One aspect of the present invention may provide a mobile communication apparatus, a position information acquiring method, and a computer-readable storage medium to locate a current position of another communication apparatus.

According to one aspect of the present invention, a mobile communication apparatus may include a transmitter/receiver configured to communicate with an external communication apparatus in order to receive first direction information indicating a direction from a position of a reference target to a position of the external communication apparatus, and first distance information indicating a distance from the position of the reference target to the position of the external communication apparatus; a direction information acquiring unit configured to acquire second direction information indicating a direction from the position of the reference target to a current position of the mobile communication apparatus; a distance information acquiring unit configured to acquire second distance information indicating a distance between the position of the reference target and the current position; a computing unit configured to compute a direction and a distance from the current position to the position of the external communication apparatus based on the first direction information, the first distance information, the second direction information, and the second distance information, in order to obtain a computation result; and an output unit configured to output the computation result of the computing unit.

According to another aspect of the present invention, a position information acquiring method to acquire, in a mobile communication apparatus, information related to a position of an external communication apparatus, may include receiving first direction information indicating a direction from a position of a reference target to a position of the external communication apparatus, and first distance information indicating a distance from the position of the reference target to the position of the external communication apparatus; acquiring second direction information indicating a direction from the position of the reference target to a current position of the mobile communication apparatus; acquiring second distance information indicating a distance between the position of the reference target and the current position; computing a direction and a distance from the current position to the position of the external communication apparatus based on the first direction information, the first distance information, the second direction information, and the second distance information, in order to obtain a computation result; and outputting the computation result of the computing.

According to still another aspect of the present invention, a non-transitory computer-readable storage medium which stores a program which, when executed by a computer, may cause the computer to perform a process including a storing procedure causing the computer to store first direction information indicating a direction from a position of a reference target to a position of the external communication apparatus, and first distance information indicating a distance from the position of the reference target to the position of the external communication apparatus, in a storage unit; a direction information acquiring procedure causing the computer to acquire second direction information indicating a direction from the position of the reference target to a current position of the mobile communication apparatus; a distance information acquiring procedure causing the computer to acquire second distance information indicating a distance between the position of the reference target and the current position; a computing procedure causing the computer to compute a direction and a distance from the current position to the position of the external communication apparatus based on the first direction information, the first distance information, the second direction information, and the second distance information, in order to obtain a computation result; and an output procedure causing the computer to output the computation result of the computing procedure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 is a flow chart for explaining an example of a position information acquiring method in an embodiment;

FIG. 11 is a block diagram illustrating an example of the mobile communication apparatus in a modification of the embodiment.

DESCRIPTION OF EMBODIMENTS

Figure 1:
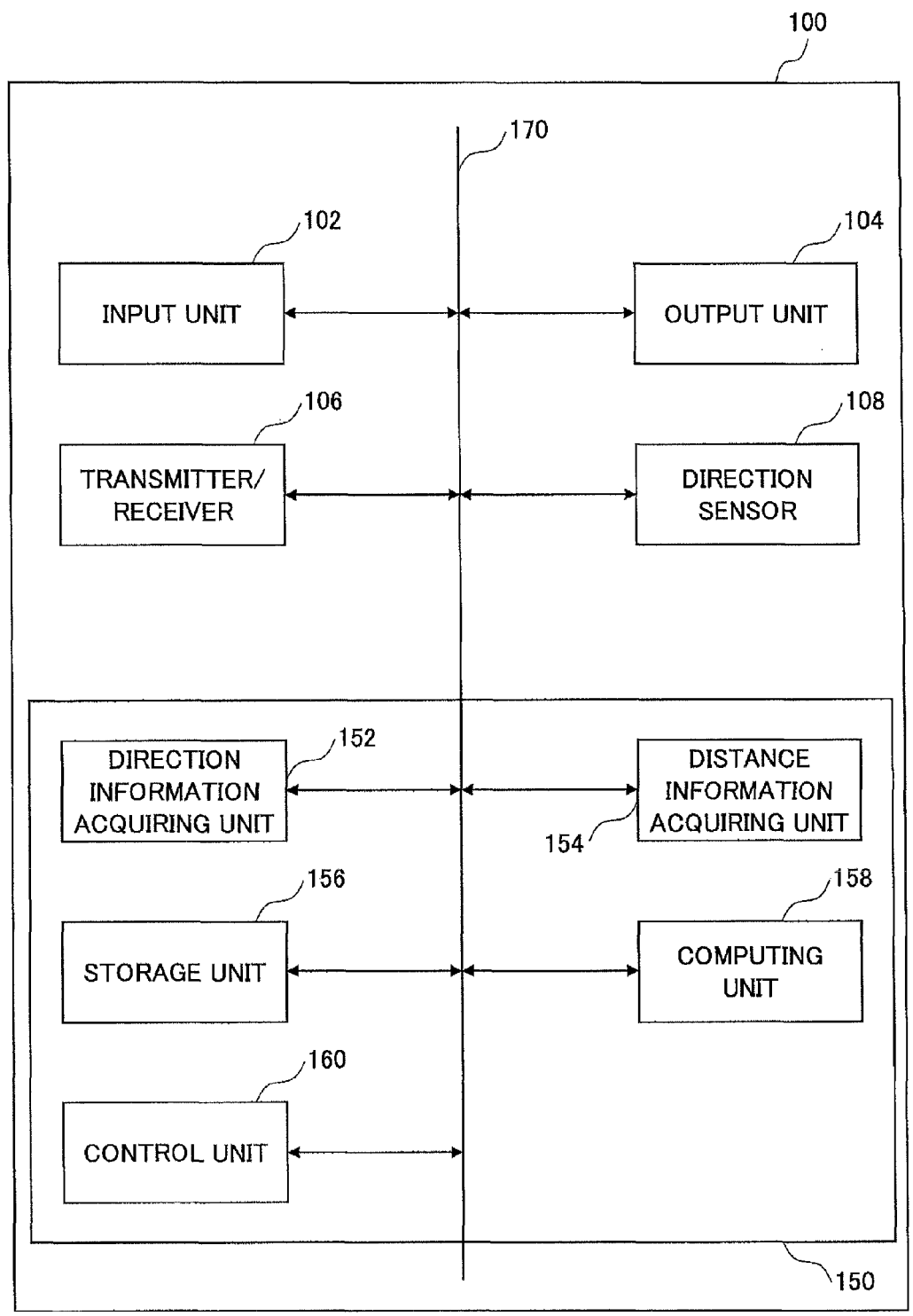
FIG. 1 is a block diagram illustrating an example of a mobile communication apparatus in an embodiment.

Preferred embodiments of the present invention will be described with reference to the accompanying drawings.

A description will now be given of a mobile communication apparatus, a position information acquiring method, and a computer-readable storage medium in each embodiment according to the present invention.

[Embodiment]

A position information acquiring system in an embodiment may acquire position information of a portable telephone carried by a sender A (hereinafter also referred to as a "first mobile communication apparatus") and a portable telephone carried by a receiver B (hereinafter also referred to as a "second mobile communication apparatus"). It is assumed for the sake of convenience that a position of the sender A is the position of the first mobile communication apparatus, and that a position of the receiver B is the position of the second mobile communication apparatus.

First, the first mobile communication apparatus acquires position information indicating the position information of the sender A with reference to a symbol (or reference target). For example, the symbol may be a landmark. Thereafter, the first mobile communication apparatus sends the position information of the sender A with reference to the symbol to the second mobile communication apparatus of the receiver B. More particularly, the position information of the sender A includes information related to a direction and a distance from the symbol to the sender A.

On the other hand, the second mobile communication apparatus receives the position information of the sender A from the first mobile communication apparatus. In addition, the second mobile communication apparatus acquires position information indicating the position information of the receiver B with reference to the symbol. More particularly, the position information of the receiver B includes information related to a direction and a distance from the symbol to the receiver B. The second mobile communication apparatuses uses the position information of the sender A and the position information of the receiver B in order to compute the direction and the distance from the receiver B to the sender A, and outputs a computation result.

The sender A may be a person who first sends the position information with reference to the symbol to the other party. On the other hand, the receiver B may be a person who receives the position information from the sender A. The first mobile communication apparatus carried by the sender A and the second mobile communication apparatus carried by the receiver B may have the same structure. Hence, the second mobile communication apparatus may send the position information, and the first mobile communication apparatus may receive the position information. In the following description, each of the sender A and the receiver B may be referred to as a user when not distinguishing the two.

Because the structures of the mobile telephone carried by the sender A (or first mobile communication apparatus) and the mobile telephone carried by the receiver B (or second mobile communication apparatus) may be the same, the structure of the portable telephone carried by the receiver B (or second mobile communication apparatus) will be described in the following for the sake of convenience. In addition, since the mobile telephone carried by the sender A (or first mobile communication apparatus) is external to the portable telephone carried by the receiver B (or second mobile communication apparatus), the mobile telephone carried by the sender A (or first mobile communication apparatus) may also be referred to as an "external communication apparatus".

Of course, the mobile communication apparatus is not limited to the portable telephone or mobile telephone. The mobile communication apparatus may be any apparatus having a communication function that may be carried by the user, such as portable terminals including PDAs (Personal Digital Assistants), and digital cameras having the communication function.

[Structure of Mobile Communication Apparatus]

A description will be given of the structure of the mobile communication apparatus in an embodiment, by referring to FIG. 1. FIG. 1 is a block diagram illustrating an example of the mobile communication apparatus in this embodiment. In this embodiment, a portable communication apparatus 100 may be a portable telephone.

As illustrated in FIG. 1, the mobile communication apparatus 100 includes an input unit 102, an output unit 104, a transmitter and receiver (hereinafter referred to as "transmitter/receiver") 106, a direction sensor 108, and an information processing unit 150 that are connected via a bus line 170.

The input unit 102 forms an input interface to receive inputs from the user, and may include a microphone, a touch-screen panel, buttons, a keyboard, and the like. As will be described later, the input unit 102 may be manipulated by the user to input a symbol, a direction from the user to the symbol, a distance between the user and the symbol, the other party (or calling destination), information indicating whether to execute a program, information indicating whether to send moving notification information, and the like.

The output unit 104 forms an output interface to output various kinds of information, and may include a display, a speaker, and the like. As will be described later, the output unit 104 may display a screen to input the symbol, a screen to input a direction from the user to the symbol, a screen to input a distance between the user and the symbol, a screen to input the other party (or calling destination), a screen to select whether to start a program, a computation result of the direction and the distance from the receiver to the sender, a screen to match directions, a screen to select whether to send the moving notification information, and the like.

The input unit 102 and the output unit 104 may be formed by a single device, such as a touch-screen panel, having the functions of both the input unit 102 and the output unit 104.

The transmitter/receiver 106 transmits information to and receives information from the other party (other communication apparatus, not illustrated) via a network. As will be described later, the transmitter/receiver 106 may function as a first mobile communication apparatus to transmit information for specifying the symbol (hereinafter also referred to as "symbol information"), information indicating the direction from the symbol to the user, information indicating the distance between the symbol and the user, the moving notification information, and the like. The transmitter/receiver 106 may also function as a second mobile communication apparatus to receive the symbol information, the information indicating the direction from the symbol to the user, the information indicating the distance between the symbol and the user, the moving notification information, and the like.

The direction sensor 108 measures the direction from the user to the symbol. The direction sensor 108 may be formed by any suitable device capable of measuring the direction from the user to the symbol, and the structure of the direction sensor 108 may not be limited to a particular structure. In this embodiment, it is assumed for the sake of convenience that the direction sensor 108 is formed by a magnetometer having 2 axes of detection, but it is of course possible to use a magnetometer having 3 axes of detection. The magnetometer measures the earth magnetism in order to detect the direction in which the mobile communication apparatus 100 is facing. As will be described later, the direction sensor 108 may be used to acquire the information indicating the direction from the symbol to the user. The information indicating the direction may be stored in a storage unit 156 which will be described later.

The information indicating the direction may include a clockwise (or counterclockwise) angle with reference to a specific azimuth (for example, east) or an azimuth represented in 4, 8, 16 or 32 divisions of a 360° angle.

The information processing unit 150 may be formed by a computer, such as a CPU (Central Processing Unit), and a memory. The information processing unit 150 may process the information transmitted and received by the mobile communication apparatus 100, the information input to the mobile communication apparatus 100, and the information output from the mobile communication apparatus 100. The information processing apparatus 150 includes a direction information acquiring unit 152, a distance information acquiring unit 154, the storage unit 156, a computing unit 158, and a control unit 160.

The direction information acquiring unit 152 acquires the information indicating the direction from the symbol to the user. More particularly, the direction information acquiring unit 152 acquires the information indicating the direction from the symbol to the user by reversing the direction from the user to the symbol measured by the direction sensor 108 when the user orients the mobile communication apparatus 100 in the direction of the symbol.

The distance information acquiring unit 154 acquires the information indicating the distance between the symbol and the user. In this embodiment, the user inputs the distance from the user to the symbol from the input unit 102. In other words, the input unit 102 receives the input of the distance between the symbol and the user, and the distance information acquiring unit 154 acquires the information indicating the distance between the symbol and the user received by the input unit 102.

The storage unit 156 may store the symbol information, the information indicating the direction from the symbol to the user, the information indicating the distance between the symbol and the user, and the like. When the mobile communication apparatus 100 functions as the second mobile communication apparatus, the storage unit 156 may store a program for causing the information processing unit 150 to execute a process of acquiring the direction and the distance from the receiver B to the sender A.

When the mobile communication apparatus 100 functions as the second mobile communication apparatus, the computing unit 158 may compute the direction and the distance from the receiver B to the sender A based on information indicating the direction from the symbol to the sender A, information indicating the direction from the symbol to the receiver B, information indicating the distance between the symbol and the sender A, and information indicating the distance between the symbol and the receiver B. Examples of the computations performed by the computing unit 158 will be described later.

When the mobile communication apparatus 100 functions as the second mobile communication apparatus, the control unit 160 may control various parts of the mobile communication apparatus 100 in order to perform the process of acquiring the distance and the direction from the receiver B to the sender A.

[Position Information Acquiring Method]

Next, a description will be given of the position information acquiring method in an embodiment, by referring to FIG. 2. FIG. 2 is a flow chart for explaining an example of the position information acquiring method in this embodiment. FIG. 2 illustrates an example in which the position (or location) of the communication apparatus of the other party is specified or detected.

It is assumed for the sake of convenience that the mobile communication apparatus of the sender A (first mobile communication apparatus) and the mobile communication apparatus of the receiver B (second mobile communication apparatus) both have the same structure as the mobile communication apparatus 100 described above in conjunction with FIG. 1. In addition, it is also assumed that the second mobile communication apparatus carried by the receiver B receives the information from the first mobile communication apparatus carried by the sender A, and acquires the direction and the distance from the receiver B to the sender A.

Steps S101 through S106 illustrated on the left side in FIG. 2 are performed by the first mobile communication apparatus at the sending end, and steps S201 through S207 illustrated on the right side in FIG. 2 are performed by the second mobile communication apparatus at the receiving end.

Figure 3A:
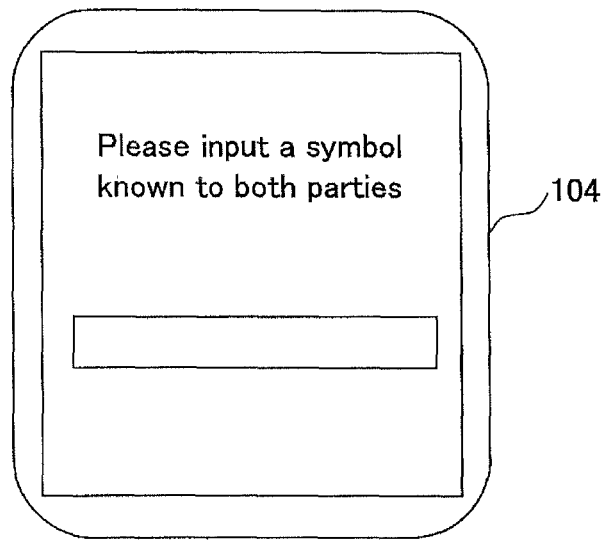
FIGS. 3A and 3B are diagrams respectively illustrating an example of a reference target input screen and an example of a screen after the reference target is input by a user.

First, a description will be given of the operation of the first mobile communication apparatus. The output unit 104 of the first mobile communication apparatus displays a reference target input screen from which the symbol (or reference target) may be input, in the step S101. FIG. 3A is a diagram illustrating an example of the reference target input screen displayed by the output unit 104 in the step S101. The output unit 104 displays a message "Please input a symbol known to both parties" in order to urge the sender A to input the symbol.

Figure 3B:
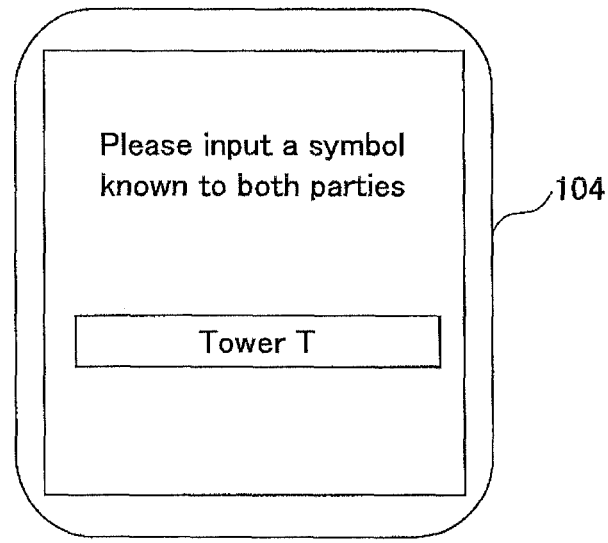

The sender A inputs the symbol from the input unit 102. For example, the sender A manipulates the keyboard and inputs "Tower T", for example. In other words, the input unit 102 receives input of reference target information for specifying the reference target, such as text information or name of the symbol "Tower T". FIG. 3B is a diagram illustrating an example of a screen displayed by the output unit 104 after the reference target is input by the sender A.

The symbol "Tower T" is input by the sender A in this example, as a symbol (or reference target) also recognizable by the receiver B, on the assumption by the sender A that the receiver B (that is, the other party) is able to identify and confirm the "Tower T".

Figure 4A:
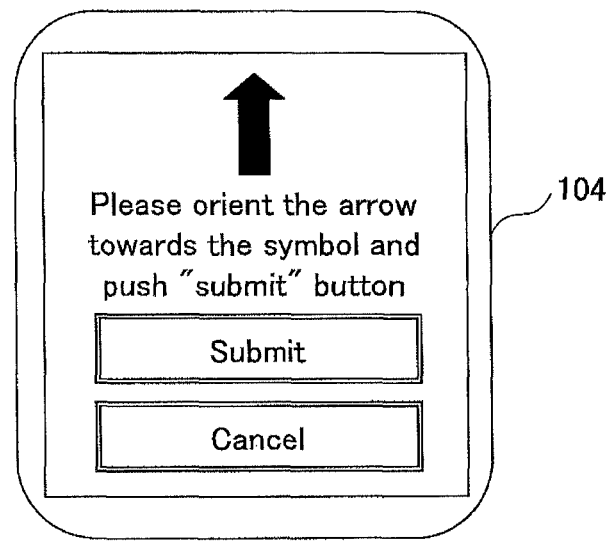
FIGS. 4A and 4B are diagrams respectively illustrating an example of a reference target direction input screen and an example of a distance input screen.

Next, the output unit 104 displays a reference target direction input screen from which the information indicating the direction from the current position (or location) of the sender A to the symbol may be input or acquired. FIG. 4A is a diagram illustrating an example of the reference target direction input screen displayed by the output unit 104. The output unit 104 displays an arrow and a message "Please orient the arrow towards the symbol and push 'submit' button" in order to urge the sender A to input the direction from the sender A to the symbol.

The sender A may orient the first mobile communication apparatus so that the display screen (or display surface) of the output unit 104 becomes horizontal (that is, parallel to a direction perpendicular to the gravitational direction) and the arrow displayed on the reference target direction input screen points towards the symbol, and then selects a "submit" button displayed on the reference target direction input screen. In other words, the input unit 102 receives the input of the direction from the sender A to the symbol. The execution of the program is cancelled when the sender A selects a "cancel" button displayed on the reference target direction input screen.

The direction sensor 108 measures the direction in which the mobile communication apparatus 100 is facing in a state in which the sender A points the arrow displayed on the reference target direction input screen towards the symbol and the "submit" button is selected. Hence, the direction information acquiring unit 152 acquires the information (hereinafter also referred to as "first direction information") indicating the direction from the position (or location) of the symbol to the current position of the sender A, based on the direction measured by the direction sensor 108 from the current position of the sender A to the symbol, in the step S102.

Figure 4B:
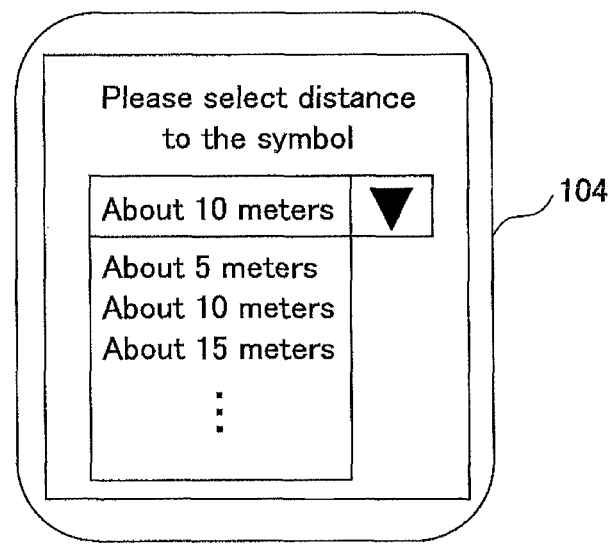

Next, the output unit 104 displays a distance input screen from which the information indicating the distance between the position of the symbol and the current position of the sender A may be input or acquired. FIG. 4B is a diagram illustrating an example of the distance input screen displayed by the output unit 104. The output unit 104 displays a message "Please select distance to the symbol" in order to urge the sender A to input the distance between the sender A and the symbol.

The sender A selects the distance (for example, "about 10 meters") to the symbol on the distance input screen. In other words, the input unit 102 receives the input of the distance between the sender A and the symbol. The distance that is input may be the distance that is judged visually by the sender A.

The distance information acquiring unit 154 acquires the information (or "first distance information") indicating the distance between the position of the symbol and the current position of the sender A, based on the distance received by the input unit 102, in the step S103.

The reference target information, the first direction information, and the first distance information may be stored in the storage unit 156 of the first mobile communication apparatus when necessary.

Figure 5A:
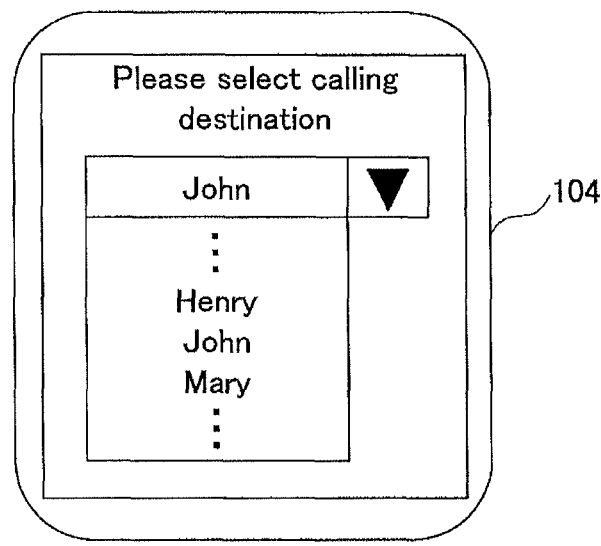
FIGS. 5A and 5B are diagrams respectively illustrating an example of a calling destination input screen and an example of a mail sending screen.

Next, the output unit 104 displays a calling destination input screen from which the other party (that is, calling destination) may be input, in the step S104. FIG. 5A is a diagram illustrating an example of the calling destination input screen displayed by the output unit 104. The output unit 104 displays names registered in advance in an address directory of the mobile communication apparatus 100, and a message "Please select calling destination" urging the sender A to input of the calling destination (calling destination).

It is assumed in this example that the sender A selects the sending destination (for example, "John"). In other words, the input unit 102 receives input of the other party selected by the sender A.

Figure 5B:
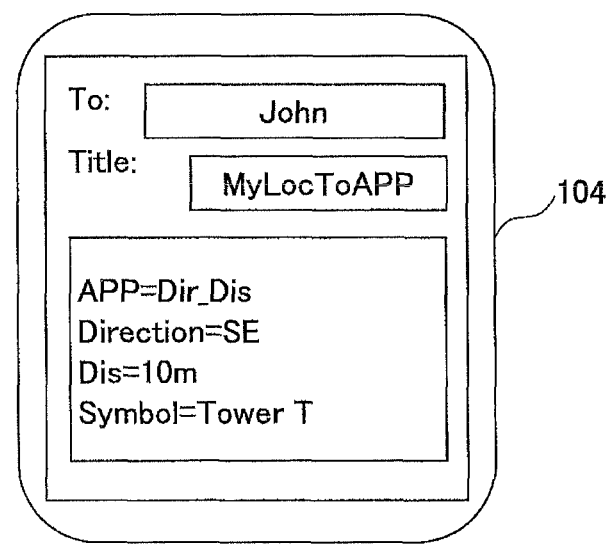

FIG. 5B is a diagram illustrating an example of a mail sending screen displayed by the output unit 104. The mail sending screen displays information to be sent from the sender A to the other party (calling destination). In this example, the information displayed in the mail sending screen includes the symbol "Tower T", the direction "SE (South-East)" from the position of the symbol to the current position of the sender A, the distance "10 m" between the symbol and the current position of the sender A, and the other party "John". In this example, the information displayed in the mail sending screen also includes information required by the other party to request the start of a specific program (or application) "Dir_Dis", for example.

Then, the transmitter/receiver 106 sends the reference target information, the first direction information, and the first distance information to the other party (receiver B) via the network, in the step S105. In this example, the transmitter/receiver 106 sends an electronic mail (hereinafter "e-mail") including the reference target information, the first direction information, and the first distance information.

Figure 6A:
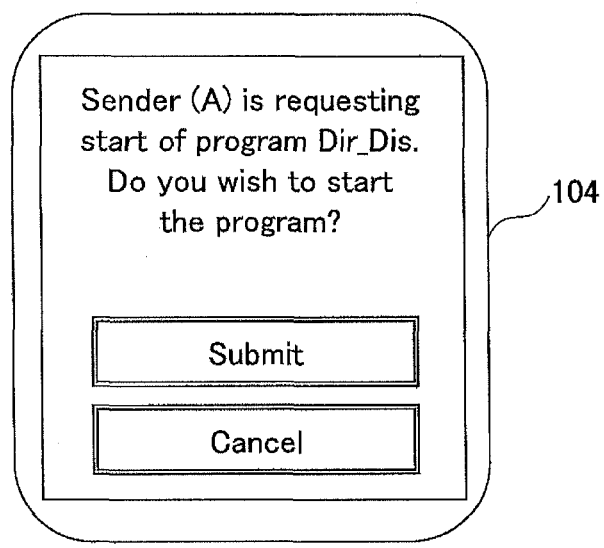
FIGS. 6A and 6B are diagrams respectively illustrating an example of a program start screen to select whether to start the program and an example of a reference target information receiving screen.

Next, a description will be given of the operation of the second mobile communication apparatus. The transmitter/receiver 106 of the second mobile communication apparatus carried by the receiver B receives the e-mail sent from the first mobile communication apparatus (or external communication apparatus) carried by the sender A. The e-mail received by the receiver B includes the reference target information, the first direction information, and the first distance information, as described above. Then, the output unit 104 displays a program start screen to select whether to start the program requested by the sender A. FIG. 6A is a diagram illustrating an example of the program start screen displayed by the output unit 104. For example, the program start screen displays a message "Sender (A) is requesting start of program Dir_Dis. Do you wish to start the program?", in order to urge the receiver B to select whether to execute the program Dir_Dis.

When the receiver B selects the "submit" button displayed in the program start screen, the program Dir_Dis stored in the storage unit 156 is called and executed. On the other hand, when the receiver B selects the "cancel" button displayed in the program start screen, the program Dir_Dis is not executed. Hence, the input unit 102 receives the input or selection on whether to execute the program Dir_Dis.

Figure 6B:
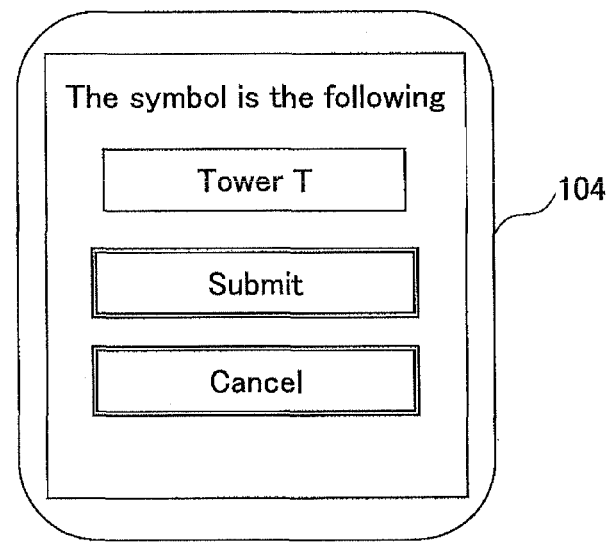

When the "submit" button displayed in the program start screen is selected and the program Dir_Dis is executed, the control unit 160 of the second mobile communication apparatus acquires the reference target information, the first direction information, and the first distance information from the received e-mail, in the step S201. In addition, the output unit 104 displays the reference target information in a reference target information receiving screen. FIG. 6B is a diagram illustrating an example of the reference target information receiving screen displayed by the output unit 104 in the step S201. In this example, the reference target information receiving screen displays a message "The symbol is the following" and "Tower T" under this message in order to urge the receiver B to confirm whether the symbol is "Tower T".

The process described later is performed when the receiver B selects the "submit" button in the reference target information receiving screen. On the other hand, when the receiver B selects the "cancel" button in the reference target information receiving screen due to some reason, such as the receiver B not being able to confirm the symbol, the second mobile communication apparatus requests the first mobile communication apparatus to send another symbol.

Next, the output unit 104 displays a reference target direction input screen from which the information indicating the direction from the current position (or location) of the receiver B to the symbol may be input or acquired. This reference target direction input screen may be similar to the reference target direction input screen illustrated in FIG. 4A. The output unit 104 displays an arrow and a message "Please orient the arrow towards the symbol and push "submit" button" in order to urge the receiver B to input the direction from the receiver B to the symbol.

The receiver B may orient the second mobile communication apparatus so that the display screen (or display surface) of the output unit 104 becomes horizontal (that is, parallel to the direction perpendicular to the gravitational direction) and the arrow displayed on the reference target direction input screen points towards the symbol, and then selects a "submit" button displayed on the reference target direction input screen. In other words, the input unit 102 receives the input of the direction from the receiver B to the symbol. The execution of the program is cancelled when the receiver B selects the "cancel" button displayed on the reference target direction input screen.

The direction sensor 108 measures the direction in which the mobile communication apparatus 100 is facing in a state in which the receiver B points the arrow displayed on the reference target direction input screen towards the symbol and the "submit" button is selected. Hence, the direction information acquiring unit 152 acquires the information (hereinafter also referred to as "second direction information") indicating the direction from the position of the symbol to the current position of the receiver B, based on the direction measured by the direction sensor 108 from the current position of the receiver B to the symbol, in the step S202.

Next, the output unit 104 displays a distance input screen from which the information indicating the distance between the position of the symbol and the current position of the receiver B may be input or acquired. This distance input screen may be similar to the distance input screen illustrated in FIG. 4B. The output unit 104 displays a message "Please select distance to the symbol" in order to urge the receiver B to input the distance between the receiver B and the symbol.

The receiver B selects the distance (for example, "about 10 meters") to the symbol on the distance input screen. In other words, the input unit 102 receives the input of the distance between the receiver B and the symbol. The distance that is input may be the distance that is judged visually by the receiver B.

The distance information acquiring unit 154 acquires the information (or "second distance information") indicating the distance between the position of the symbol and the current position of the receiver B, based on the distance received by the input unit 102, in the step S203.

The reference target information, the first direction information, the first distance information, the second direction information, and the second distance information may be stored in the storage unit 156 of the second mobile communication apparatus when necessary.

Then, the computing unit 158 computes the direction and the distance from the current position of the receiver B to the current position of the sender A, based on the first direction information, the first distance information, the second direction information, and the second distance information, in the step S204. A description will be given of an example of a method of computing the direction and the distance from the current position of the receiver B to the current position of the sender A, by referring to FIG. 7.

Figure 7:
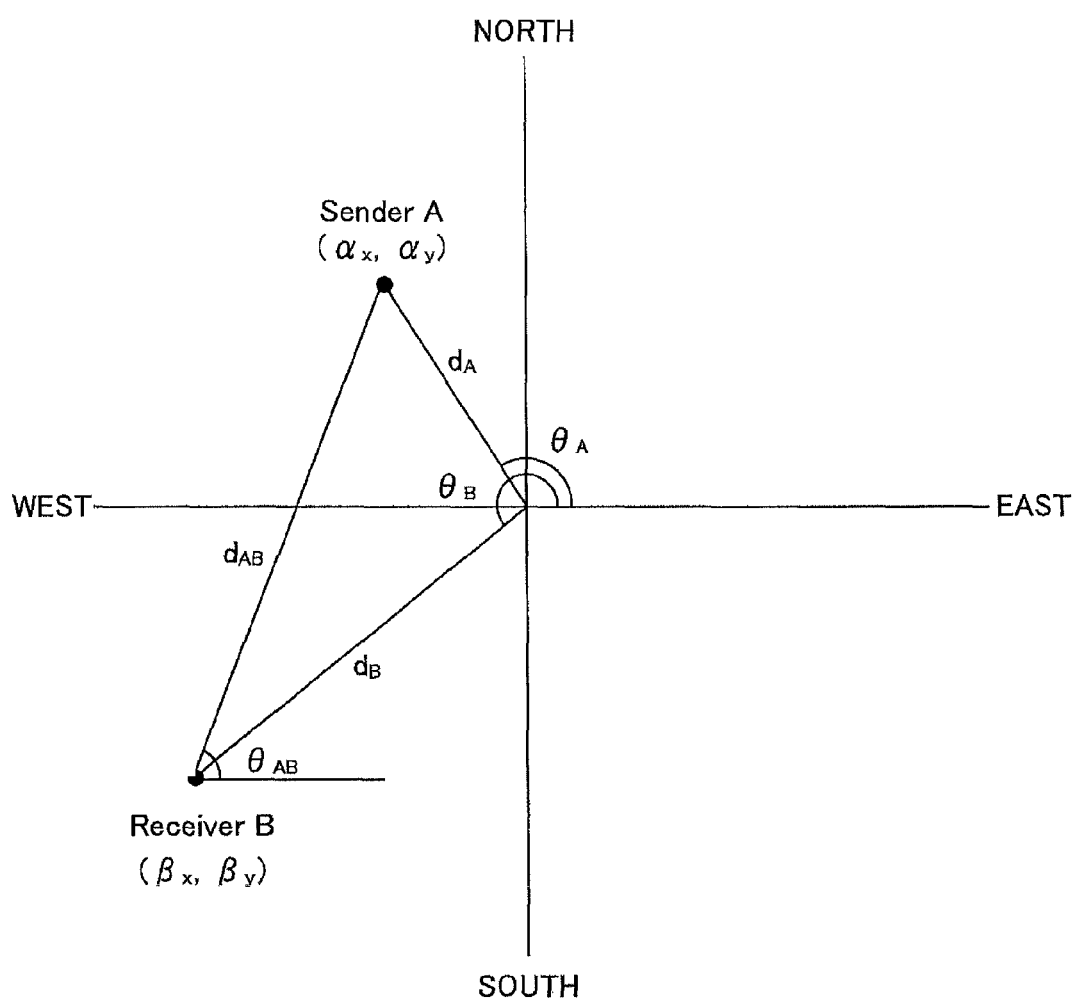
FIG. 7 is a diagram illustrating an example of a positional relationship of a receiver and a sender.

FIG. 7 is a diagram illustrating an example of a positional relationship of the receiver and the sender. In FIG. 7, the ordinate indicates the North-South direction, the abscissa indicates the West-East direction, and the origin indicates the position of the symbol. In addition, the distance between the symbol and the current position of the sender A is denoted by $d_A$, and the distance between the symbol and the current position of the receiver B is denoted by $d_B$. Using the east direction from the symbol as a reference, the direction from the symbol to the current position of the sender A is denoted by an angle $\theta_A$, and the direction from the symbol to the current position of the receiver B is denoted by an angle $\theta_B$. In this state, when the coordinate of the sender A is denoted by ($\alpha_x$, $\alpha_y$) and the coordinate of the receiver B is denoted by ($\beta_x$, $\beta_y$), each coordinate value $\alpha_x$, $\alpha_y$, $\beta_x$, and $\beta_y$ may be determined by the following formulas.

$$\alpha_x = d_A \cos \theta_A$$

$$\alpha_y = d_A \sin \theta_A$$

$$\beta_x = d_B \cos \theta_B$$

$$\beta_y = d_B \sin \theta_B$$

Values of parameters $d_A$, $\theta_A$, $d_B$, and $\theta_B$ may be obtained from the first distance information, the first direction information, the second distance information, and the second direction information, respectively.

Accordingly, the distance $d_{AB}$ between the sender A and the receiver B may be obtained from the following formula.

$$d_{AB} = [(\alpha_x - \beta_x)^2 + (\alpha_y - \beta_y)^2]^{1/2}$$

In addition, the angle $\theta_{AB}$ indicating the direction from the receiver B to the sender A may be obtained from the following formula.

$$\tan \theta_{AB} = (\alpha_y - \beta_y)/(\alpha_x - \beta_x)$$

The computing unit 158 may compute the direction and the distance from the current position of the receiver B to the current position of the sender A in the above described manner, based on the first direction information, the first distance information, the second direction information, and the second distance information.

Figure 8:
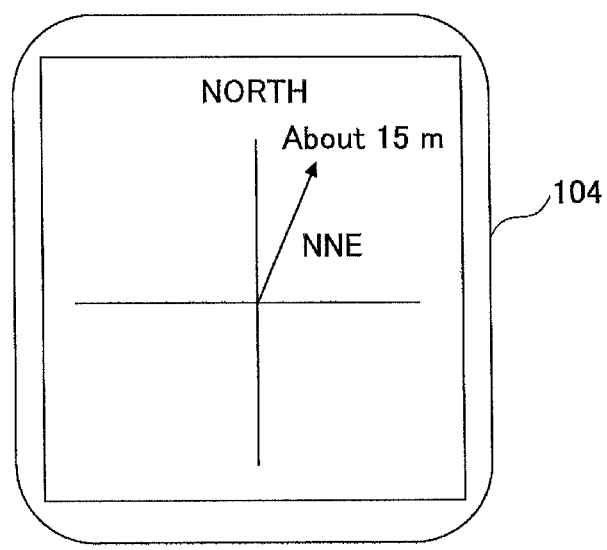
FIG. 8 is a diagram illustrating an example of a display of the direction and the distance from the receiver to the sender.

Next, the output unit 104 outputs the computation result of the direction and the distance from the current position of the receiver B to the current position of the sender A, in the step S205. FIG. 8 is a diagram illustrating an example of a display of the direction and the distance from the receiver to the sender. In this example, the output unit 104 displays the direction "NNE (North-NorthEast)" from the current position of the receiver B to the current position of the sender A, and the distance "about 15 m" from the current position of the receiver B to the current position of the sender A.

Therefore, the receiver B may recognize the direction and the distance from the current position of the receiver B to the current position of the sender A, from the display made in the step S205.

Figure 9A:
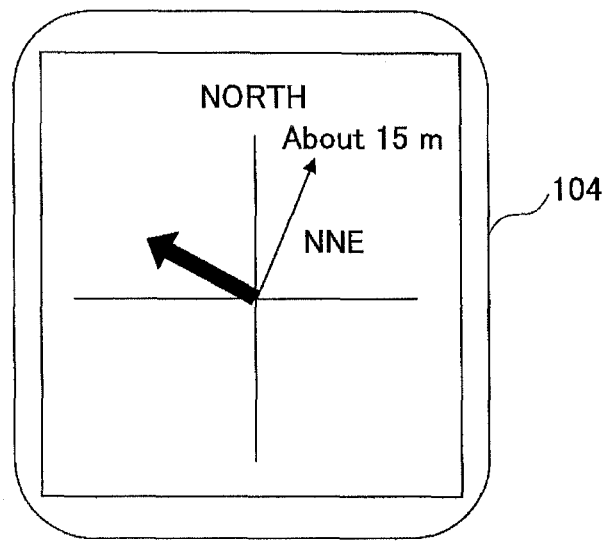
FIGS. 9A and 9B are diagrams respectively illustrating an example of a direction matching screen and an example of the direction matching screen when the mobile communication apparatus is turned.

Next, the output unit 104 of the second mobile communication apparatus displays a direction matching screen, in the step S206. FIG. 9A is a diagram illustrating an example of the direction matching screen. In this example, the output unit 104 displays the direction and the distance from the current position of the receiver B to the current position of the sender A, and also displays the North (N) direction measured by the direction sensor 108 by a bold arrow, in the direction matching screen.

Figure 9B:
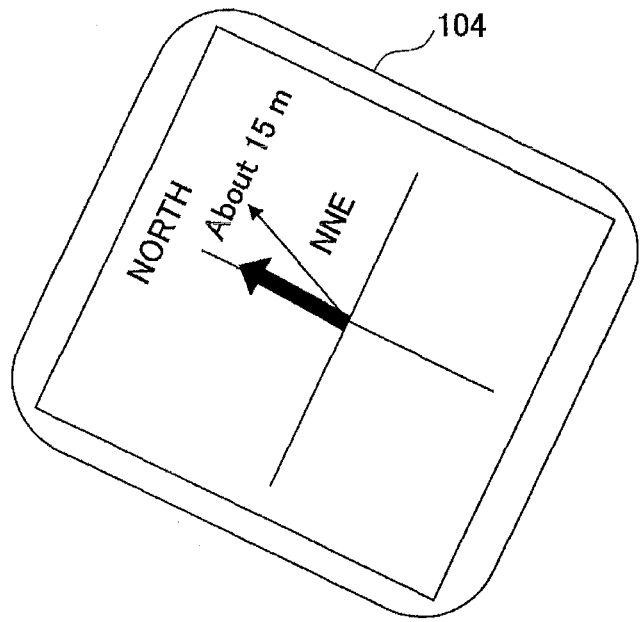

The receiver B then turns (or rotates) the mobile communication apparatus 100 in a direction such that the coordinate axis indicating North (N) and the bold arrow indicating the North (N) direction overlap as illustrated in FIG. 9B. FIG. 9B is a diagram illustrating an example of the direction matching screen when the mobile communication apparatus is turned. By this operation made by the receiver B, the receiver B may recognize the direction to the sender A with reference to the direction in which the receiver B is facing.

Figure 10:
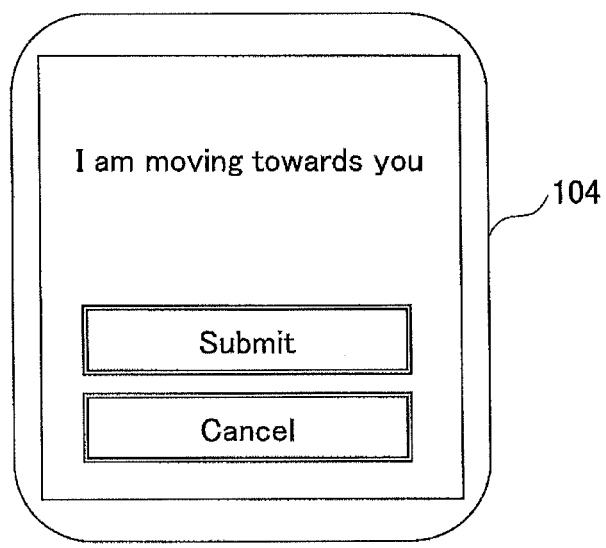
FIG. 10 is a diagram illustrating an example of a confirmation screen to confirm whether to send moving notification information.

Next, the output unit 104 of the second mobile communication apparatus displays a confirmation screen from which a confirmation may be made on whether to send information (hereinafter also referred to as "moving notification information") that indicates the moving of the receiver B towards the sender A. FIG. 10 is a diagram illustrating an example of the confirmation screen to confirm whether to send the moving notification information. In this example, the output unit 104 displays the confirmation screen that displays a message "I am moving towards you", in order to urge the receiver B to confirm or select whether this moving notification information is to be sent to the sender A.

When the receiver B selects the "submit" button in the confirmation screen, the transmitter/receiver 106 of the second mobile communication apparatus sends the moving notification information to first mobile communication apparatus of the sender A via the network, in the step S207.

In this case, the transmitter/receiver 106 of the first mobile communication apparatus receives the moving notification information sent from the second mobile communication apparatus, in the step S106.

Therefore, the sender A may recognize from the moving notification information that the receiver B is moving towards the sender A.

The processes described above may be performed when the information processing unit 150 of the mobile communication apparatus 100 executes the program stored in the storage unit 156. The program may be prestored in the storage unit 156 of the mobile communication apparatus 100 or, stored in the storage unit 156 when the mobile communication apparatus 100 receives the program via the network. In addition, the program may be read from a computer-readable storage medium by the information processing unit 150 and stored in the storage unit 156. The computer-readable storage medium or the storage unit 156 prestoring the program therein may be formed by any suitable non-transitory computer-readable storage medium, including semiconductor devices and disk or card media employing the magnetic, optical or magneto-optical recording technique.

According to the mobile communication apparatus, the position information acquiring method, the position information acquiring system, and the program which, when executed by a computer, causes the computer to perform a process in accordance with the position information acquiring method, may recognize or specify the position of the other party (that is, the sender A) at the receiver B by acquiring the position information of the sender A with reference to the position of the symbol. More particularly, the direction sensor 108 may be used to acquire the information indicating the direction from the symbol (reference target) to the user, and to acquire the information indicating the distance between the symbol and the user. The direction and the distance from the current position of the receiver B to the current position of the sender A may be obtained based on the information indicating the direction from the symbol to the user and the information indicating the distance between the symbol and the user. For this reason, even when the measurement error of the GPS is relatively large or, the radio waves from the GPS satellite is faint, the user may positively recognize or specify the position of the other party.

Next, a description will be given of modifications of the embodiment described above.

[Modifications of Embodiment]

FIG. 11 is a block diagram illustrating an example of the mobile communication apparatus in a modification of the embodiment. In FIG. 11, those parts that are the same as those corresponding parts in FIG. 1 are designated by the same reference numerals, and a description thereof will be omitted. A mobile communication apparatus 100 illustrated in FIG. 11 may include a distance measuring unit 110 in addition to the elements illustrated in FIG. 1.

The distance measuring unit 110 measures the distance between the symbol and the user. The distance measuring unit 110 may be formed by any device capable of measuring the distance between the symbol and the user, and is not limited to a particular structure. For example, the distance measuring unit 110 may use a focal distance of a camera, use two cameras for triangulation, use a laser beam from a laser light source as in a LRF (Laser Range Finder), use ultrasonic waves, or use light, in order to measure the distance to the symbol. As will be described later, the measuring unit 110 may be used to acquire the information indicating the distance between the symbol and the user. The information indicating the distance between the symbol and the user, acquired by the measuring unit 110, may be stored in the storage unit 156.

In a first modification of the embodiment, the distance information acquiring unit 154 may acquire the information indicating the distance between the symbol and the user, based on the distance between the symbol and the user measured by the distance measuring unit 110. In other words, in the steps S102 and S202 illustrated in FIG. 2, the distance measuring unit 110 measures the distance between the symbol and the user. As a result, it may be unnecessary for the user to input the distance to the symbol in the steps S102 and S202.

According to this first modification, the troublesome operation required by the user to input the distance to the symbol may be omitted. The distance from the user to the symbol may be measured accurately in a range in which the measuring accuracy of the distance measuring unit 110 is relatively high.

The mobile communication apparatus 100 illustrated in FIG. 11 may include an imaging unit (or camera) 112 in addition to the elements illustrated in FIG. 1.

The imaging unit 112 picks up an image of the symbol. For example, the imaging unit 112 may be formed by a CCD (Charge Coupled Device), a CMOS (Complementary Metal Oxide Semiconductor) device, and the like. As will be described later, the imaging unit 112 is used to pick up the image of the symbol to be sent from the sender A to the receiver B, when the mobile communication apparatus 100 functions as the first mobile communication apparatus.

In a second modification of the embodiment, the image of the symbol picked up by the imaging unit 112 is used as the reference target information. For this reason, in the step S101 illustrated in FIG. 2, the output unit 104 may display a message "Please take image of symbol", for example, in order to urge the sender A to pick up (or shoot) the image of the symbol.

According to this second modification, the symbol may be recognized or specified from the image of the symbol, even when the sender A does not know the name of the symbol, for example. In other words, the receiver B may recognize the symbol specified by the sender A from the image of the symbol, because the symbol may have a distinctive shape, for example.

When the imaging unit 112 picks up the image of the symbol in this second modification, the distance measuring unit 110 may also be used to measure the distance between the symbol and the user from the focal distance of the camera, for example. In this case, the steps S101 and S103 illustrated in FIG. 2 may be performed simultaneously, and the reference target information and the first distance information may be acquired more easily.

Furthermore, when the imaging unit 112 picks up the image of the symbol, the direction sensor 108 may measure the direction in which the mobile communication apparatus 100 faces, so that the information indicating the direction from the symbol to the user may be acquired based on the direction measured by the direction sensor 108. In this case, the steps S101 through S103 illustrated in FIG. 2 may be performed simultaneously, and the reference target information, the first direction information, and the first distance information may be acquired more easily.

In a third modification of the embodiment, the step S101 illustrated in FIG. 2 may be omitted. In other words, the step S101 may be omitted in its entirety or, the process may advance to the next step S101 without having to input the symbol information.

According to this third modification, the position of the other party may be recognized or specified without having the user to input the name of the symbol or the like, in a case in which the symbol is determined beforehand between the user and the other party (that is, the sender A and the receiver B), such as a case in which the user plans to meet the other party at the position of the symbol.

In a fourth modification of the embodiment, a step may be additionally performed in the second mobile communication apparatus, in order to send the information indicating the current position of the receiver B to the mobile communication apparatus (first mobile communication apparatus) of the sender A. In other words, after the second mobile communication apparatus acquires the second direction information and the second distance information, the transmitter/receiver 106 of the second mobile communication apparatus may send the second direction information and the second distance information to the mobile communication apparatus (first mobile communication apparatus) of the sender A via the network. In addition, the transmitter/receiver 106 of the first mobile communication apparatus may receive the second direction information and the second distance information sent from the second mobile communication apparatus. In this case, the sender A may recognize the current position of the receiver B with reference to the symbol.

Moreover, in the fourth modification, the second mobile communication apparatus may additionally perform a step to send the computation result of the direction and the distance from the current position of the receiver B to the current position of the sender A, to the mobile communication apparatus (first mobile communication apparatus) of the sender A. In other words, after the second mobile communication apparatus computes the direction and the distance from the current position of the receiver B to the current position of the sender A, the transmitter/receiver 106 of the second mobile communication apparatus may send the computation result of the direction and the distance from the current position of the receiver B to the current position of the sender A to the first mobile communication apparatus of the sender A via the network. In addition, the transmitter/receiver 106 of the first mobile communication apparatus receives the computation result of the direction and the distance from the current position of the receiver B to the current position of the sender A computed by and sent from the second mobile communication apparatus. In this case, the sender A may recognize the direction and the distance from the receiver B to the sender A.

Next, a description will be given of applications of the embodiment and modifications in example situations.

In a case in which a sender A plans to meet a receiver B near ticket gates of a busy station where a large number of passengers pass the ticket gate, the sender A and the receiver B may agree beforehand to meet near a person-attended ticket gate, that is, the symbol. In this case, the sender A or the receiver B, who arrives at the symbol first, may send the current position to the other party in order to have the other party come to the symbol. When the ticket gate is inside the station building or located underground, the measurement error of the GPS may be relatively large or, the radio waves from the GPS satellite may be faint. But according to the embodiments and modifications described above, the person who arrived at the symbol (that is, the meeting place) first may acquire the direction and distance to the current position of this person from the current position of the other party who arrived after this person, without having to reply on the GPS.

In addition, when the meeting place is in an event site, a stadium, a theme park or the like, the sender A and the receiver B may agree beforehand to meet near a stage, an electric bulletin board, an entrance gate or the like, that is, the symbol. In this case, the sender A or the receiver B, who arrives at the symbol first, may send the current position to the other party in order to have the other party come to the symbol. When the meeting place is indoors or surrounded by high buildings, for example, the measurement error of the GPS may be relatively large or, the radio waves from the GPS satellite may be faint. But according to the embodiments and modifications described above, the person who arrived at the symbol (that is, the meeting place) first may acquire the direction and distance to the current position of this person from the current position of the other party who arrived after this person, without having to reply on the GPS.

Furthermore, two people may become separated in an event site, a stadium, a theme park or the like. In this case, a first person may find a conspicuous symbol, such as a stage, an electric bulletin board, an entrance gate or the like, and notify the current position of this first person with reference to the symbol to the second person, in order to have the second person come to the first person. According to the embodiments and modifications described above, the two people who become separated may reunite at the symbol by notifying the current position of one person with reference to the symbol to the other person, in order to have the other person come to the symbol, without having to reply on the GPS.

Although the embodiments or modifications are numbered with, for example, "first," "second," "third," or "fourth," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A mobile communication apparatus comprising:
   a transmitter/receiver configured to communicate with an external mobile communication apparatus in order to receive first direction information indicating a direction from a position of a reference target to a position of the external mobile communication apparatus, and first distance information indicating a distance from the position of the reference target to the position of the external mobile communication apparatus;
   a direction information acquiring unit configured to acquire second direction information indicating a direction from the position of the reference target to a current position of the mobile communication apparatus;
   a distance information acquiring unit configured to acquire second distance information indicating a distance between the position of the reference target and the current position;
   a computing unit configured to compute a direction and a distance from the current position to the position of the external mobile communication apparatus based on the first direction information, the first distance information, the second direction information, and the second distance information, in order to obtain a computation result; and
   an output unit configured to output the computation result of the computing unit.

2. The mobile communication apparatus as claimed in claim 1, further comprising:
   a direction sensor,
   wherein the direction information acquiring unit acquires the second direction information based on a direction of the mobile communication apparatus detected by the direction sensor when the mobile communication apparatus faces the reference target.

3. The mobile communication apparatus as claimed in claim 1, further comprising:
   an input unit configured to receive input of the distance between the position of the reference target and the current position,
   wherein the distance information acquiring unit acquires the second distance information based on the distance input received by the input unit.

4. The mobile communication apparatus as claimed in claim 1, further comprising:
   a distance measuring unit configured to measure the distance between the position of the reference target and the current position,
   wherein the distance information acquiring unit acquires the second distance information based on the distance measured by the distance measuring unit.

5. The mobile communication apparatus as claimed in claim 1, wherein the transmitter/receiver receives reference target information for specifying the reference target, and the direction information acquiring unit and the distance information acquiring unit respectively acquire the second direction information and the second distance information based on the reference target information.

6. The mobile communication apparatus as claimed in claim 1, wherein the transmitter/receiver sends the direction and the distance from the current position to the external mobile communication apparatus, computed by the computing unit, to the external mobile communication apparatus.

7. A position information acquiring method to acquire, in a mobile communication apparatus, information related to a position of an external mobile communication apparatus, comprising:
   receiving first direction information indicating a direction from a position of a reference target to a position of the external mobile communication apparatus, and first distance information indicating a distance from the position of the reference target to the position of the external mobile communication apparatus;

acquiring second direction information indicating a direction from the position of the reference target to a current position of the mobile communication apparatus;

acquiring second distance information indicating a distance between the position of the reference target and the current position;

computing a direction and a distance from the current position to the position of the external mobile communication apparatus based on the first direction information, the first distance information, the second direction information, and the second distance information, in order to obtain a computation result; and outputting the computation result of the computing.

8. The position information acquiring method as claimed in claim 7, wherein the acquiring the second direction information acquires the second direction information based on a direction of the mobile communication apparatus detected by a direction sensor when the mobile communication apparatus faces the reference target.

9. The position information acquiring method as claimed in claim 7, further comprising:
receiving input of the distance between the position of the reference target and the current position,
wherein the acquiring the second distance information acquires the second distance information based on the distance input received by the receiving the input of the distance.

10. The position information acquiring method as claimed in claim 7, further comprising:
measuring the distance between the position of the reference target and the current position,
wherein the acquiring the second distance information acquires the second distance information based on the distance measured by the measuring.

11. The position information acquiring method as claimed in claim 7, wherein
the receiving the first direction information and the first distance information receives reference target information for specifying the reference target, and
the acquiring the second direction information and the acquiring the second distance information respectively acquire the second direction information and the second distance information based on the reference target information.

12. The position information acquiring method as claimed in claim 7, further comprising:
sending the direction and the distance from the current position to the external mobile communication apparatus, computed by the computing, to the external mobile communication apparatus.

13. A non-transitory computer-readable storage medium which stores a program which, when executed by a computer, causes the computer to perform a process comprising:
a storing procedure causing the computer to store first direction information indicating a direction from a position of a reference target to a position of the external mobile communication apparatus, and first distance information indicating a distance from the position of the reference target to the position of the external mobile communication apparatus, in a storage unit;
a direction information acquiring procedure causing the computer to acquire second direction information indicating a direction from the position of the reference target to a current position of the mobile communication apparatus;
a distance information acquiring procedure causing the computer to acquire second distance information indicating a distance between the position of the reference target and the current position;
a computing procedure causing the computer to compute a direction and a distance from the current position to the position of the external mobile communication apparatus based on the first direction information, the first distance information, the second direction information, and the second distance information, in order to obtain a computation result; and
an output procedure causing the computer to output the computation result of the computing procedure.

14. The non-transitory computer-readable storage medium as claimed in claim 13, wherein the direction information acquiring procedure causes the computer to acquire the second direction information based on a direction of the mobile communication apparatus detected by a direction sensor when the mobile communication apparatus faces the reference target.

15. The non-transitory computer-readable storage medium as claimed in claim 13, wherein the process further comprises:
an input procedure causing the computer to receive input of the distance between the position of the reference target and the current position,
wherein the distance information acquiring procedure causes the computer to acquire the second distance information based on the distance input received by the input procedure.

16. The non-transitory computer-readable storage medium as claimed in claim 13, wherein the process further comprises:
a distance measuring procedure causing the computer to measure the distance between the position of the reference target and the current position by a distance measuring unit,
wherein the distance information acquiring procedure causes the computer to acquire the second distance information based on the distance measured by the distance measuring procedure.

17. The non-transitory computer-readable storage medium as claimed in claim 13, wherein the process further comprises:
a receiving procedure causing the computer to receive reference target information for specifying the reference target by a receiver,
wherein the direction information acquiring procedure and the distance information acquiring procedure respectively cause the computer to acquire the second direction information and the second distance information based on the reference target information.

18. The non-transitory computer-readable storage medium as claimed in claim 13, wherein the process further comprises:
a procedure causing the computer to send the direction and the distance from the current position to the external mobile communication apparatus, computed by the computing procedure, to the external mobile communication apparatus by a transmitter.

* * * * *